United States Patent [19]

Coucher

[11] 3,909,068
[45] Sept. 30, 1975

[54] POWDER FEEDER
[75] Inventor: Robert G. Coucher, Salt Lake City, Utah
[73] Assignee: EPPCO, Salt Lake City, Utah
[22] Filed: Jan. 4, 1974
[21] Appl. No.: 430,721

[52] U.S. Cl. .................... 302/26; 222/194; 302/49
[51] Int. Cl.² ......................................... B65G 53/40
[58] Field of Search .................. 302/49, 24, 26, 41; 222/373, 194

[56] References Cited
UNITED STATES PATENTS

| | | | |
|---|---|---|---|
| 2,314,031 | 3/1943 | Colburn | 222/194 X |
| 3,178,235 | 4/1965 | Zimmerman | 302/49 |
| 3,318,641 | 5/1967 | Mommsen | 302/49 |
| 3,391,963 | 7/1968 | Weeks | 302/41 X |

FOREIGN PATENTS OR APPLICATIONS

| | | | |
|---|---|---|---|
| 1,116,335 | 1/1956 | France | 302/49 |

Primary Examiner—Robert B. Reeves
Assistant Examiner—John P. Shannon
Attorney, Agent, or Firm—Trask & Britt

[57] ABSTRACT

A powder feeder is disclosed for delivering metered amounts of a fluid powdered substance to a nozzle for distribution. The powder feeder includes a gas-powder distribution wheel mounted for rotation within a closed housing. The distribution wheel contains a plurality of axially bored, equidistantly spaced powder and gas receiving cavities. The powdered substance is stored in an agitatable vibrating hopper connected to a powder inlet port bored in the upper section of the wheel housing. Powder from the hopper passes through the powder inlet and into the powder-receiving cavities whenever the rotating cavities are in registry with the powder inlet port. A second or gas inlet port is bored in the lower or bottom section of the housing for introducing a pressurized gas into the powder and gas receiving cavities as each cavity comes into registry with a gas inlet port and a gas and powder outlet port. In a preferred embodiment, a gas bypass line is provided to direct the pressurized gas into either the powder receiving cavity, which has been filled with a powder, or the gas receiving cavity. A second bypass line is provided which connects the powder receiving and gas receiving cavities with the outlet port in the upper or top section of the housing. A synchronous motor or other driving indexing means is connectingly keyed to a shaft connected to the rotatable distribution wheel for continuous or intermittent rotation of the wheel. With the above powder feeder, metered quantities of a fluid powdered substance separated by a gas pulse can be carried from the outlet port through an outlet line for introduction into a nozzle for distribution or other distributing devices such as a plasma spray gun. The above described powder feeder system provides a means whereby a constant and reproducible amount of a fluid powdered substance can be deposited as a coating on various types of substrates such as the inner walls of containers.

16 Claims, 3 Drawing Figures

POWDER FEEDER

BACKGROUND OF THE INVENTION

1. Field

This invention is directed to a dispensing device and particularly to a pulsating or intermittent powder feeder for generating discreet metered quantities of a powdered substance separated by a gas pulse.

2. State of the Art

Numerous devices have been reported in the prior art describing various types of powder feeders for introducing or metering a uniform and continuous flow of powder into a gas stream. Some of the more pertinent patents which disclose such metering devices include U.S. Pat. Nos. 3,517,861, 3,501,097, 3,498,260, 2,314,031 and 3,201,001. Although most of the above patented devices are primarily concerned with avoiding intermittent flows and have perfected their devices to provide a substantially continuous uniform and repeatable flow, some patents (for example, U.S. Pat. No. 3,498,260) disclose a device for intermittent flow. However, the device is not designed to dispense discreet and reproducible metered amounts on a regular basis. Instead, excess amounts of powder are dispensed, with the excess being collected and recycled for use.

In certain chemical or spraying operations, it is essential that a reproducible metered amount of a powder material be introduced into a gas stream for eventual dissemination and use. For example, in certain coating operations it is essential, from both an economic and operational standpoint, that exact metered quantities of free flowing particulated materials be introduced into a gas stream for eventual dissemination as a coating on a surface. The use of an exact metered quantity is critical to insure that the substrate is not undercoated or that unnecessary and excessive coatings are not deposited on the substrate. In specific coating operations (for example, coating the internal walls of containers to be used in storing foodstuffs and/or beverages), an improperly or insufficiently coated container can have a deleterious effect on the taste of the material stored therein, while overcoating can cause waste and thereby substantially increase the cost of the coating operation. In addition, when excess amounts of powder are used during the coating operation, a system is normally required for recovering and recycling the excess powder in order to prevent waste and excessive contamination of the environment. In many instances the recovery system can be as expensive to install and maintain as the original powder feeding systems.

SUMMARY OF THE INVENTION

The problems and shortcomings above mentioned have been resolved by the powder feeding mechanism of this invention which includes basically a system and apparatus for combining discreet metered amounts of a powdered or particulated substance into a carrier gas whereby the powdered or particulated materials are transported by the carrier gas in slugs or in periodic concentrated amounts such that each slug or grouping of powdered materials is separated by a preselected volume of carrier gas.

The above is achieved by the pulsating powder feeder of this invention which comprises a shafted distribution wheel containing a plurality of peripherally positioned powder and gas receiving cavities. The cavities are so positioned on the wheel that discreet or metered quantities of powder and gas are combined in an outlet line leading to a nozzle or other type of distribution means. More specifically, the powder-gas distribution wheel is rotatably carried on a shaft journaled in two opposing enclosure members forming the wheel's housing. A port is provided in the housing for introducing a powdered substance into each powder receiving cavity as the cavity comes into registry with the port. A second port is provided for introducing a carrier gas sequentially into the gas cavity and the powder receiving cavity. As the distribution wheel is rotated and as each cavity comes into registry with the inlet and outlet ports, metered quantities of the powdered substance contained in the powder filled cavity are forced into an outlet line by the carrier gas followed by a predetermined volume of carrier gas escaping from the gas filled cavity. The particulates are in effect transported through the line in discreet slugs separated or enveloped by a sheath of carrier gas. The flow of gas within the line not only maintains a separation between the slugs of powdered particulates but also provides a convenient means for flushing the lines carrying the particulates. With the above system, a discreet and reproducible quantity of powdered material is continually introduced into a nozzle or spraying means. This reproducibility ensures that a substantially identical quantity of powdered substance, followed by a specific volume of carrier gas, will be emitted and deposited on each substrate placed in its flow path.

DESCRIPTION OF THE PREFERRED EMBODIMENT

Figure 1:
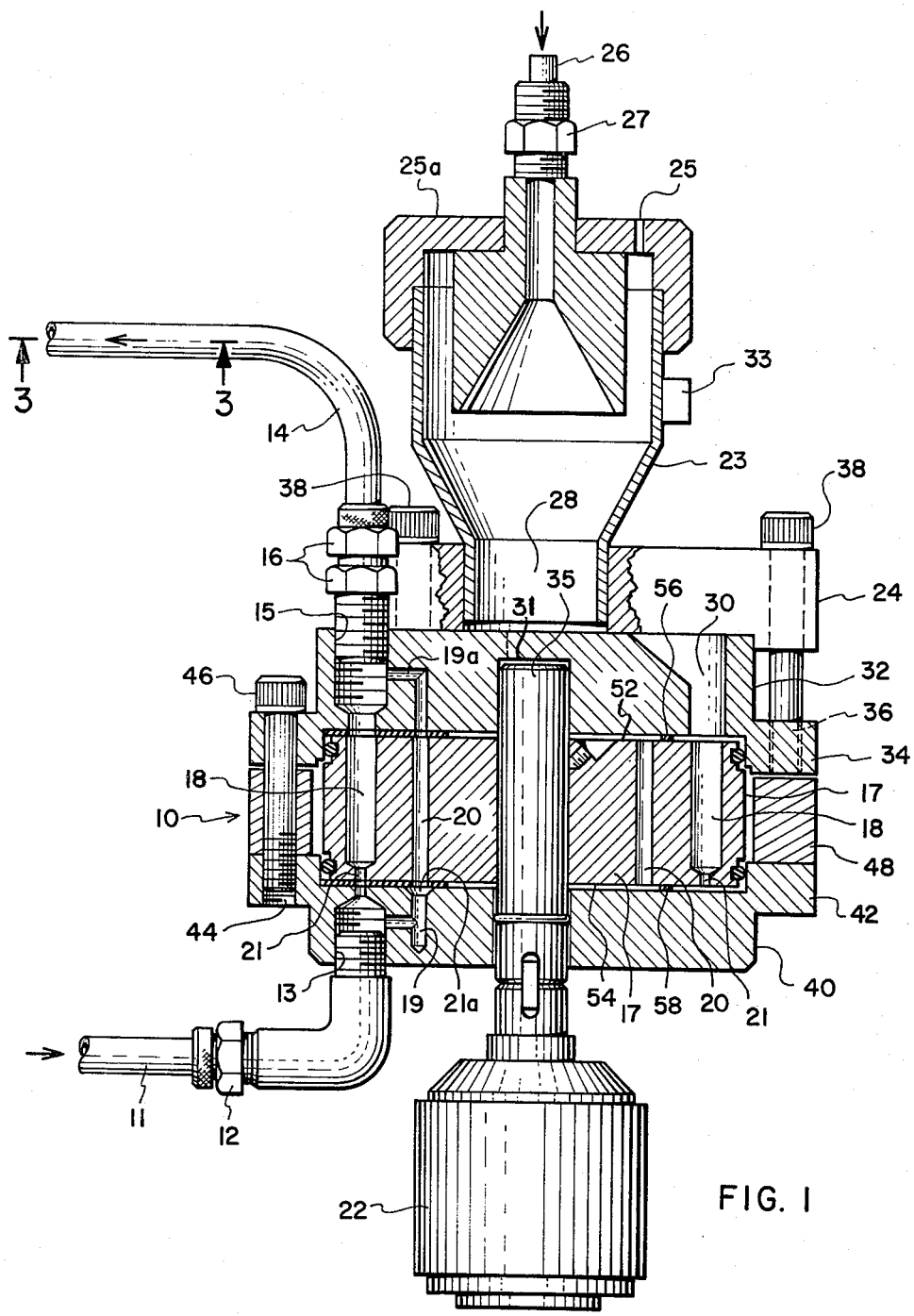
FIG. 1 is a side elevation with parts of the powder feeder of this invention in vertical cross-section.
Figure 2:
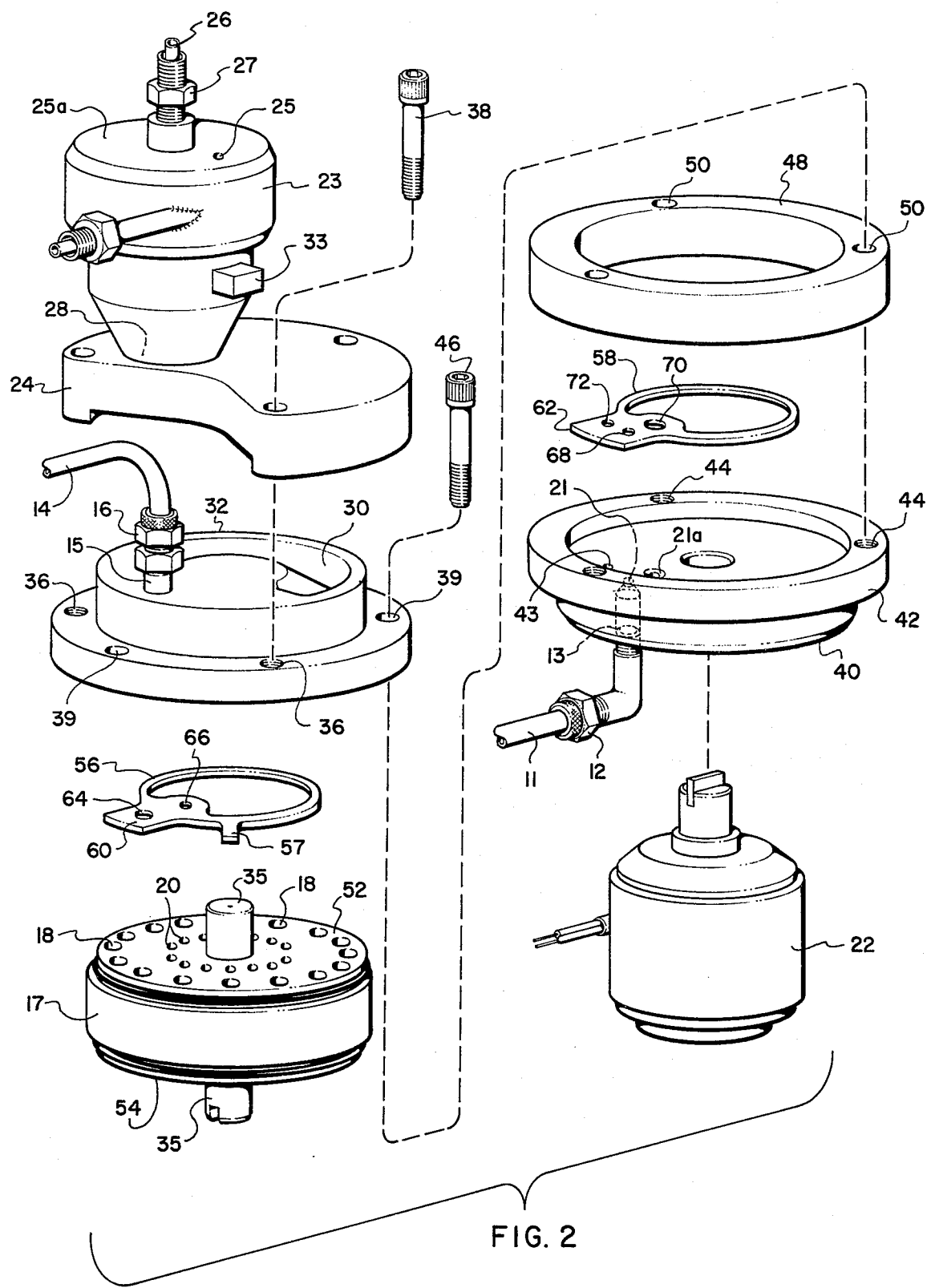
FIG. 2 is an exploded view of the powder feeder shown in FIG. 1.

As is shown in FIGS. 1 and 2, the powder feeder of this invention includes a powder feeder housing shown generally by numeral 10 having a threaded gas inlet line 11 connected through adapters 12 to a gas inlet port 13 and a threaded gasparticulate outlet line 14 connected by adapters 16 to an outlet port 15. Within the housing a rotatable gas-particulate metering and distribution wheel 17 is mounted. The distribution wheel contains peripherally positioned particulate receiving and collecting cavities 18 and gas receiving cavities 20. The upper and lower sections of the particulate receiving cavities 18 and the gas receiving cavities 20 are communicatively joined by bypass conduits 19 and 19a respectively. The bypass conduits permit the gas introduced through line 11 to exit through one of two gas outlet ports 21 and 21a and enter either of the two cavities 18 and 20 depending on which port is in registry with which cavity. The distribution wheel is rotated by an intermittent magnetic breaking motor or other suitable power means 22. Above the housing 10, a hopper 23 of conventional design is mounted for which stored particulates are introduced into the particulate collecting cavities 18.

The hopper 23 is of conical design (that is, it is broader at the top than at the bottom) and is mounted on a base plate 24. Preferably the hopper 23 contains a vent opening 25 located at or near its top cover 25a. Particulates are introduced into the hopper through a threaded inlet line 26 containing suitable adapters 27 and exit through an outlet opening 28. The particulates pass from the hopper 23 and opening 28 through a slanted or converging arcuate opening 30 cut into an upper or top cover member 32 of housing 10. To insure there is a continuous flow of particulates from the hopper, an agitating means such as a vibrator 33 is mounted to the outside wall of the hopper 23. Although a vibrator is shown, other means for preventing packing of the particulates along the hopper's inner side walls and insuring the particulates' gravitational fall through the outlet openings in the hopper may be used. For example, a flapper may be used or a pulsating air line emitting pulses of air may be introduced into the base of the hopper for agitating the particulates stored therein. The air may be supplied for any readily available source or may be obtained by recycling the vent gases released from the particulate collecting cavities 18. The base plate 24 is mounted to the top cover 32 such that hopper outlet 28 is in registry with the converging arcuate opening 30. The top cover member 32 is generally circular in shape and includes an annular lip or ledge 34 extending out radially therefrom. A blind hole 31 for receiving one end of a rotatable shaft 35 which is mounted to the distribution wheel 16 is bored centrally into the top cover 32. To minimize wear to the shaft 35 and to the blind opening 31 during rotation of the distribution wheel, the blind opening 31 may be enlarged and a friction reducing assembly such as a ball bearing ring may be inserted therein for receiving one end of the shaft 35. The other end of the shaft 35 may also be adapted with a similar type of friction reducing assembly. Other conventional friction reducing means may be used where increased or reduced rotational speeds are employed. The ledge 34 contains threaded openings 36 for receiving threaded upper locking bolts 38 and nonthreaded openings 39 through which threaded locking and adjusting bolts 46 pass.

The housing 10 also includes a bottom or lower cover member 40 having an annular lip or ledge 42 with threaded openings 44 for receiving lower locking and adjusting bolts 46. The lower cover member 40 also contains a central opening 47 through which the other end of shaft 35 passes and a lower vent opening 43 which functions as a relief passage, allowing any pressurized gas retained in the particulate collecting cavity 18 to escape prior to being exposed to the arcuate opening 30 containing particulate materials. The release of the confined gas prevents blow back of the particulate materials during refilling of the particulate receiving cavities. Intermediate the upper and lower cover is a ring spacer 48 having an outer diameter approximating that of the two ledges 34 and 42. However, the inner diameter of the ring is slightly larger than the inner diameter of both ledges 34 and 42 of the top and lower cover. This permits the wheel 16 to rotate freely about its shaft 35 supported within the housing 10. This ring spacer likewise contains nonthreaded openings 50 through which the threaded locking bolts 46 pass holding the top cover 32, ring spacer 48 and lower cover 42 members in aligned securement.

The upper and lower face 52 and 54 of the distribution wheel 16 are adapted to receive an upper and lower Teflon gasket 56 and 58 respectively. This gasket functions as both a sealing and lubricating means between the wheel 16 and the upper and lower cover members 32 and 40. The upper and lower housing cover members 32 and 40 respectively are provided with a substantially flat seat upon which the respective upper and lower gaskets rest. Both of these gaskets have an inner and outer diameter of such dimensions that they fit in between the gas receiving (inner) 20 and particulate receiving (outer) 18 cavities except for the tongue portions 60 and 62 which override sections of both of the inner and outer cavities. By tightening locking and adjusting bolts 46, the upper and lower covers are urged together, sandwiching the gaskets against the distribution wheel to provide concomitantly a sealing and lubricating system therebetween. As the Teflon gaskets become worn from the rotation of the distribution wheel, periodic tightening of the bolts 46 may be required.

As shown, the gaskets contain overriding tongues 60 and 62 respectively. Tongue 60 contains a pair of openings 64 and 66 positioned such that they will override and register with the particulate and gas cavities 18 and 20 respectively. In addition, tongue 60 contains an outward extending wiper appendage 57 for passage over the particulate receiving cavities. The wiper appendage is made of a soft, nonabrasive material such as felt and functions as a wiper or brush as it passes over the particulate receiving cavities. Tongue 62 likewise contains a pair of openings 68 and 70 which, like openings 64 and 66, are radially positioned to register with the particulate and gas cavities 18 and 20. A third opening 72 is provided in the lower tongue to register with the vent opening 43 bored through the lower housing cover 40. With the gaskets shown, the gas and particulate cavities are sealingly separated from each other as well as providing a sealing separation between each of the ports opening onto the face of the distribution wheel and thereby prevents any of the gas and/or particulates from escaping into any of the neighboring ports or cavities. As indicated above, a vent opening 43 is provided in the lower cover 40 for venting and releasing any pressurized gas that may have accumulated in the particulate collecting cavity following pressurization and removal of the particulates from the collecting cavity. The released gas pressures, as earlier suggested, may be vented to the atmosphere or be recycled through a line leading into the base of hopper 23. This recycling technique may be used as an alternative to the vibrator 33 shown in the drawings. The pulsating pressurized gas introduced therein maintains the particulates in a fluid condition and insures even and continuous filling of the particulate cavities 18.

Figure 3:
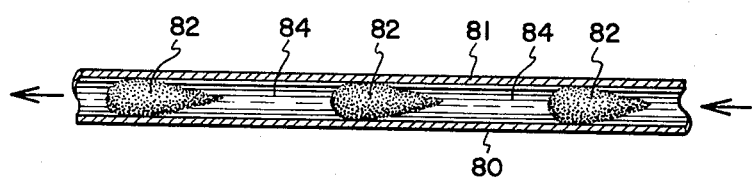
FIG. 3 is an enlarged view of an exit line leading from the outlet port of the device shown in FIG. 1 which graphically depicts the manner in which the powdered substances are carried through the line.

As shown in FIG. 2, the particulate collecting cavities and the gas receiving cavities are positioned in a spaced circular relationship such that a line 80 drawn radially from the center of the disk will intersect either a gas receiving or a particulate collecting cavity but not both. Preferably a line drawn radially in between the inner and outer cavities will be tangential to both. This insures that a gas receiving cavity and a particulate collecting cavity will not be in registry with the gas inlet port at the same time. This provides a clear demarcation between the particulate slugs or masses of particulates carried through the outlet line and the gas sheath which propels the particulates through the outlet line and insures that the slugs of particulates remain relatively concentrated. This is more clearly shown in FIG. 3 where an outlet line 81 is shown carrying slugs or masses of particulates depicted by the numeral 82. The spaces 84 in between the particular masses represents the gas which follows the masses and propels them through the outlet line to a nozzle or distribution means such as a plasma spray gun. A description of a plasma spray gun which is especially well suited for use with the powder feeder of this invention can be found in U.S. patent application Ser. No. 337,005 filed on Mar. 1, 1973 and which is incorporated herein by reference.

One of the advantages of the system of this invention is that there is a substantially continuous flow being emitted as opposed to a sporadic or burping flow. However, if a continuous gas flow is not essential, it would be possible to achieve a relatively smooth pulsating flow by employing only a single circular row of cavities. With such a system, every other cavity would be a particulate receiving cavity and each particulate receiving cavity would be followed by a gas receiving cavity. In another embodiment which employs a single circular row of cavities, each cavity serves both as a particulate and gas receiving cavity. In such a system, the wheel would have to pause briefly over the gas inlet port to permit a sufficient flow of gas to follow each concentrated slug of particulates before exposing the next or adjacent cavity to the gas inlet port. An obvious disadvantage of such a system is that the flow would not be as smooth as that which is obtained with the system depicted in the drawings or the system having alternating particulate and gas receiving cavities.

In operation, the hopper 23 of the powder feeding device 10 is filled with a particulate substance such as various thermoplastic polymers including Nylon D-11, Eppon epoxies, phenolics and other types of polymeric materials. Inorganic materials such as tungsten carbide, glass or combinations of inorganic and organic particulate materials may also be used. Various types of liquids may also be distributed by the powder feeder of this invention. The particulates or liquids are introduced into the hopper 23 through the inlet time 26 and stored therein until rotation of the distribution wheel is initiated. As the distribution wheel is rotated, the particulates pass from the hopper 23 through the converging arcuate opening 30 in the top cover 32 and into each of the particulate collecting cavities 18 as they come into registry. The upper gasket 56 remains stationary while the wiper appendage 57 passes over the particulate cavities 18 insuring that reproducible amounts of particulate matter are introduced into each of the particulate metering cavities. As the wheel 17 is rotated, the particulate metering cavities 18 come into registry with the gas inlet port 13 and the outlet port 15. At the instant that the two ports are in registry, the pressurized gas introduced into the gas inlet port propels the particulates out of the metering cavity and into the outlet line 14. As the wheel 17 continues to rotate, the gas receiving cavities 20 positioned internally of the particulate metering cavities comes into registry with the gas inlet and outlet ports. The pressurized gas enters the gas receiving cavity through the gas bypass channel 19 and exits through the outlet line 14 via a second bypass 19a. In so doing, the outlet line 14 is flushed of any particulates that are retained therein, and the slug or concentrated portion of the particulates is propelled through the line to a nozzle or other distribution means (not shown). An electric motor 22 keyed to shaft 35 rotates the gas-particulate distribution wheel, either on a slow, continuous basis or on a on and off fashion at a speed of about 20 revolutions per minute and more generally about 10 revolutions per minute. The gas introduced into the system is generally maintained at a pressure of between 10 and 100 lbs. psi gauge and preferably about 60 lbs. psi gauge. However, higher or lower gas pressures may be used if desired. The size of the particulate materials fed into the above system is generally between about −50 mesh and submicron sizes. However, the device may be adapted to accept larger sized particulates and even liquids as may be required by the needs of a particular operation.

Tests which have been conducted utilizing a −100 mesh material with the device above described indicated that the powder feeder of this invention is capable of providing continuous and reproducible slugs of particulate matter and that the average reproducible concentration of each slug approached 97 to 99% reproducibility.

While the invention has been described with reference to specific embodiments, it should be understood that certain changes may be made by one skilled in the art and would not thereby depart from the spirit and scope of this invention which is limited only by the claims appended hereto.

I claim:
1. A powder feeder comrising:
  a housing having bored therein a powder inlet port, a gas inlet port and a powder-gas outlet port;
  a means for introducing particulates into said powder inlet port;
  a distribution wheel rotatably mounted on a shaft carried within said housing, said distribution wheel having a plurality of particulate metering cavities and a plurality of cavities for conducting gas only, means for introducing gas into said gas inlet port; and
  a means for rotating said distribution wheel so that said gas inlet port will come into alternate registry with said particulate metering cavities and said cavities for conducting gas only.

2. The powder feeder of claim 1 wherein said particulate metering cavities are positioned in a circular row near the outer edge of said distribution wheel and said cavities for conducting gas only are positioned in a circular row in between said particulate metering cavities and the center of said distribution wheel.

3. The powder feeder of claim 2 including a second gas inlet port for registering with said cavity for conducting gas only.

4. The powder feeder of claim 1 wherein said housing comprises upper and lower cover members.

5. The powder feeder of claim 4 wherein said distribution wheel includes an axial shaft, and wherein the ends of said shaft are mounted for rotation in said upper and lower cover members respectively.

6. The powder feeder of claim 5 wherein said distribution wheel has an upper face and lower face each adapted to receive a sealing means.

7. The powder feeder of claim 6 wherein said shaft is connected to said means for rotating said distribution wheel.

8. The powder feeder of claim 6 wherein said sealing means is a gasket positioned in between said circular rows of particulate metering cavities and cavities for conducting gas only.

9. The powder feeder of claim 8 wherein said gasket includes a tongue having a pair of openings, one of which will overlie one of the particulate metering cavities and the other will overlie one of the cavities for receiving gas only.

10. The powder feeder of claim 4 wherein said lower cover member includes a vent opening.

11. The powder feeder of claim 2 including a means for storing particulates.

12. The powder feeder of claim 11 wherein said means for storing particulates includes a particulate agitating means.

13. The powder feeder of claim 11 wherein said powder inlet port opens into an arcuate opening positioned in said housing above several of said particulate metering cavities.

14. The powder feeder of claim 1 wherein said housing comprises an upper cover member and lower cover member separated by a ring spacer.

15. The powder feeder of claim 14 wherein tongued gaskets separate the upper and lower cover members from said distribution wheel.

16. The powder feeder of claim 15 wherein said tongued gaskets are constructed from a material which will permit said tongued gaskets to function as both sealing and lubricating means.

* * * * *

UNITED STATES PATENT OFFICE
CERTIFICATE OF CORRECTION

Patent No. 3,909,068          Dated September 30, 1975

Inventor(s) Robert G. Coucher

It is certified that error appears in the above-identified patent and that said Letters Patent are hereby corrected as shown below:

Column 5, line 43, change "time" to -- line --.

Signed and Sealed this twenty-third Day of March 1976

[SEAL]

Attest:

RUTH C. MASON
Attesting Officer

C. MARSHALL DANN
Commissioner of Patents and Trademarks